US010585713B2

(12) United States Patent
Vaishnavi (10) Patent No.: US 10,585,713 B2
(45) Date of Patent: Mar. 10, 2020

(54) SYSTEM AND METHOD FOR DYNAMIC ORCHESTRATION

(71) Applicant: Huawei Technologies Co., Ltd., Shenzhen (CN)

(72) Inventor: Ishan Vaishnavi, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 218 days.

(21) Appl. No.: 15/648,061

(22) Filed: Jul. 12, 2017

(65) Prior Publication Data

US 2017/0308407 A1 Oct. 26, 2017

Related U.S. Application Data

(63) Continuation of application No. PCT/EP2015/050464, filed on Jan. 13, 2015.

(51) Int. Cl.
*G06F 9/46* (2006.01)
*G06F 9/50* (2006.01)
(Continued)

(52) U.S. Cl.
CPC .......... *G06F 9/5072* (2013.01); *G06F 9/5077* (2013.01); *G06F 9/5083* (2013.01);
(Continued)

(58) Field of Classification Search
None
See application file for complete search history.

(56) References Cited

U.S. PATENT DOCUMENTS 7,240,107 B2   7/2007   Chase-Salerno et al.
7,636,916 B2   12/2009  Bello et al.
(Continued)

FOREIGN PATENT DOCUMENTS

CN   101938416 A   1/2011
WO   2011087584 A2  7/2011

OTHER PUBLICATIONS

Bar-Ilan et al.,"Approximation Algorithms for Selecting Network Centers (Preliminary Version)," pp. 343-354, Lecture Notes in Computer Science Algorithms and Data structures, vol. 519, Springer, Berlin, Heidelberg (First Online: Jun. 17, 2005; Published1991).
(Continued)

*Primary Examiner* — Kenneth Tang
(74) *Attorney, Agent, or Firm* — Leydig, Voit & Mayer, Ltd.

(57) ABSTRACT

A system for dynamic orchestration is provided, the system configured to be used for embedding a virtual network into a physical infrastructure, the system comprising: a decision component which is configured to evaluate a performance of at least one orchestrator $(O_1, O_2, \ldots, O_n)$ based on at least one parameter $(P_1, P_2, \ldots, P_n)$, and which is configured to settle on a recomposing of the orchestrator $(O_1, O_2, \ldots, O_n)$ based on the evaluated performance and, which is configured to provide a recomposing signal $(RS_1, RS_2, \ldots, RS_n)$ when the recomposing is settled; and a recomposing component which is configured to execute the recomposing of the orchestrator $(O_1, O_2, \ldots, O_n)$ when the recomposing signal $(RS_1, RS_2, \ldots, RS_n)$ is received.

15 Claims, 7 Drawing Sheets

(51) Int. Cl.
  *H04L 12/24*  (2006.01)
  *H04L 12/26*  (2006.01)
  *H04L 29/08*  (2006.01)

(52) U.S. Cl.
  CPC ........ *H04L 41/042* (2013.01); *H04L 41/0893* (2013.01); *H04L 41/5096* (2013.01); *H04L 43/0817* (2013.01); *H04L 67/00* (2013.01); *H04L 41/0695* (2013.01); *H04L 41/12* (2013.01); *H04L 43/10* (2013.01); *H04L 43/16* (2013.01)

(56) References Cited

U.S. PATENT DOCUMENTS

| | | |
|---|---|---|
| 7,643,408 B2 | 7/2010 | Atkinson et al. |
| 2003/0167295 A1 | 9/2003 | Choo |
| 2003/0217171 A1 | 11/2003 | Von Stuermer et al. |
| 2006/0136928 A1 | 6/2006 | Crawford, Jr. et al. |
| 2006/0167674 A1 | 7/2006 | Loisey et al. |
| 2011/0314520 A1 | 12/2011 | Olszewski et al. |
| 2012/0297249 A1 | 11/2012 | Yang et al. |
| 2013/0138816 A1 | 5/2013 | Kuo et al. |
| 2014/0307556 A1* | 10/2014 | Zhang ................ H04L 45/302 370/236 |
| 2016/0191345 A1 | 6/2016 | Despotovic et al. |
| 2016/0191370 A1* | 6/2016 | Wood .................. H04L 45/02 370/238 |

OTHER PUBLICATIONS

CN 201580070531.0, Office Action, dated Jun. 10, 2019.
EP 1488251.7-1215, Office Action, dated Jun. 14, 2019.

* cited by examiner

FIG. 9

SYSTEM AND METHOD FOR DYNAMIC ORCHESTRATION

CROSS-REFERENCE TO RELATED APPLICATIONS

This application is a continuation of International Application No. PCT/EP2015/050464, filed on Jan. 13, 2015, the disclosure of which is hereby incorporated by reference in its entirety.

TECHNICAL FIELD

The embodiments of the present application relate to the field of embedding virtual network appliances into virtualized or physical substrates. In particular the present application relates to a system and a method system for dynamic orchestration.

BACKGROUND

The term "embedding" refers to the allocation of virtualized network functions and respective resources including network resources over possibly physical or virtual network and compute environments. Embedding virtual network appliances into virtualized or physical substrates requires a set of network components responsible for deciding where that embedding will be performed, storing the decision in a database and furthermore managing the creation and maintenance of the correct performance of those components.

The term "orchestration" as used by the embodiments of the present invention may describe the automated arrangement, coordination, and management of complex computer systems, middleware, and services or any kind of network management or operation and includes the embedding of virtualized network functions.

With increasing number of physical resources, virtual appliances or the number of requests for mapping the performance of the orchestrator is bound to decrease significantly or the requirements for quicker solutions bound to increase. With increasing physical resources the average time taken to calculate the optimal embedding increases exponentially. The problems arise due to static treatment of orchestration requests. This renders those solutions slow, inefficient and prone to errors in various cases.

Every orchestrating component orchestrates a set of "domain controllers". A domain controller can be any kind of control entity in the infrastructure. This includes as examples in the present world entities, such as OpenFlow controllers, cloud management systems, hypervisors, lower layer orchestrators and so on.

The following patents describe work that is similar to this patent but does not affect the innovativeness of this patent.

US 2003/0167295 A1 describes a method, a system and a computer program to balance the computational and network load in networked computers using self-replicating programs, so-called symbionts. The method presented therein reduces hotspots by encapsulating a resource in a symbiont, and having a user access that symbiont through programs that host symbionts, referred to as hosts. Our definition of self-replicating orchestrators is much different from that of self-replicating programs for load balancing.

U.S. Pat. No. 7,636,916 B2 describes copy operations in a data storage system. A host device directs that a volume of customer data be stored through one of two virtual storage servers on media in an associated library. An initiating controller queues a request to copy the volume to a second library. An initiating controller queues a request to copy the volume to a second library. If the request is not processed by the initiating controller within a predetermined period, the initiating controller broadcasts the copy request to other controllers, each of which queues the request. The patent uses broadcasting of the request to achieve determined processing times which is different from replicating control and management structures for the network.

SUMMARY

It is the objective of the invention to provide an improved technique for realizing dynamic orchestration.

This objective of dynamism is achieved by the features of the independent claims. Further implementation forms are apparent from the dependent claims, the description and the figures.

According to a first aspect, a system for dynamic orchestration is provided, the system configured to be used for embedding a virtual network into a physical infrastructure, the system comprising: a decision component which is configured to evaluate a performance of at least one orchestrator or a performance of a domain controller (DomC) or a performance of orchestrated infrastructure, based on at least one parameter, and which is configured to settle on a recomposing of the at least one orchestrator based on the evaluated performance and, which is configured to provide a first recomposing signal when the recomposing is settled; and a recomposing component which is configured to execute the recomposing of the at least one orchestrator when a second recomposing signal is received.

Therefore the present invention advantageously provides that a physical resource of the physical infrastructure is associated to at least one domain controller and a domain controller is associated to at least one orchestrator. Based on the performance feedback this association can be changed by the decision component, e.g. setting a decision, and the recomposing component, e.g. performing a merging or a splitting or any transformation in composition. To do this the recomposing component can create and/or delete existing orchestrators and/or domain controllers and copy the relevant information of the existing orchestrators.

The embodiments of the present invention may apply to future carrier networks that need to be able to scale to a vast plurality of nodes, interconnect a vast plurality of devices, and, especially, provide support for the diversified requirements of carrier grade next-generation services.

In a first possible implementation form of the system according to the first aspect, the recomposing component is configured to execute the recomposing by assigning or reassigning at least one domain controller to the at least one orchestrator. This advantageously provides a reduction in time by automatic expansion and reduction of the domain controllers.

In a second possible implementation form of the system according to the first aspect as such or according to the first implementation form of the first aspect, the decision component is configured to evaluate the performance based on a size of a physical infrastructure of the embedded virtual network, a number of domain controllers (DomCs) assigned to the orchestrator, a topology of the physical infrastructure, or a performance parameter of the physical infrastructure as the at least one parameter. This advantageously provides an improved performance of the dynamic orchestration.

In a third possible implementation form of the system according to the first aspect as such or according to the any of the preceding implementation forms of the first aspect, the decision component is configured to settle on a splitting of the orchestrator based on the evaluated performance and wherein the decision component is configured to provide a first splitting signal as the first recomposing signal when the splitting is settled, wherein the recomposing component is configured to execute a splitting of the orchestrator when a second splitting signal as the second recomposing signal is received. This advantageously provides an enhanced embedding of a virtual network into a physical infrastructure.

In a fourth possible implementation form of the system according to the third preceding implementation form of the first aspect, the recomposing component is configured to execute the splitting of the orchestrator by allocating resources for installing a new orchestrator and wherein the recomposing component is configured to allocate at least one domain controller of the at least one orchestrator to the new orchestrator. This advantageously provides an improved performance of the dynamic orchestration.

In a fifth possible implementation form of the system according to the first aspect as such or according to the any of the preceding implementation forms of the first aspect, the decision component is further configured to settle on a merging of at least two orchestrators based on the evaluated performance and wherein the decision component is configured to provide a first merging signal as the first recomposing signal when the merging is settled and wherein the recomposing component is configured to execute a merging of the at least two orchestrators when a second merging signal as the second recomposing signal is received. This advantageously provides an adjusted recomposing of the virtual network.

In a sixth possible implementation form of the system according to the fifth preceding implementation form of the first aspect, the recomposing component is configured to execute the merging of the at least two orchestrators by allocating resources for the merged orchestrator and wherein the recomposing component is configured to allocate at least one domain controller to the merged orchestrator. This advantageously provides an adjusted recomposing of the virtual network.

In a seventh possible implementation form of the system according to the first aspect as such or according to any of the preceding implementation forms of the first aspect, the recomposing component is configured to execute the merging of the at least two orchestrators by allocating resources for the merged orchestrator, wherein the recomposing component is configured to allocate at least one domain controller to the merged orchestrator. This advantageously provides an improved performance of the dynamic orchestration.

In an eighth possible implementation form of the system according to the first aspect as such or according to any of the preceding implementation forms of the first aspect, the recomposing component is configured to install the merged orchestrator by reconfiguring the at least one domain controller to be allocated to the merged orchestrator. This advantageously provides an enhanced embedding of a virtual network into a physical infrastructure.

According to a second aspect, the invention relates to a computer system for embedding a virtual network into a physical infrastructure comprising: a domain controller, an orchestrator and a system for dynamic orchestration according to the first aspect as such or according to any of the preceding implementation forms of the first aspect.

In a first possible implementation form of the computer system according to the second aspect, the computer system is configured to be used in a carrier grade telecommunication or in a computer network. This advantageously provides that the system can be used in next-generation networks.

According to a third aspect, the invention relates to a method for dynamic orchestration for embedding a virtual network into a physical infrastructure, the method comprising: evaluating a performance of at least one orchestrator based on at least one parameter; settling on a recomposing of the orchestrators based on the evaluated performance; providing a first recomposing signal, when the recomposing is settled; and executing the recomposing of the orchestrator when a second recomposing signal is received. This advantageously provides an improved performance of the dynamic orchestration.

In a first possible implementation form of the method according to the third aspect, the step of settling on a recomposing of the orchestrator comprises a splitting of the orchestrator and wherein a first splitting signal is provided as the first recomposing signal when the splitting is settled and wherein a splitting of the orchestrator is executed when a second splitting signal as the second recomposing signal is received. This advantageously provides an adjusted recomposing of the virtual network.

In a second possible implementation form of the method according to the third aspect or according to the first possible implementation form of the method according to the third aspect, the step of evaluating the performance of the at least one orchestrator comprises determining whether a failure of at least one domain controller or of at least one orchestrator or of an communication channel is present. This advantageously provides an enhanced embedding of a virtual network into a physical infrastructure.

In a third possible implementation form of the method according to the third aspect as such or according to the any of the preceding implementation forms of the third aspect, the step of settling on a recomposing of the orchestrators comprises a merging of at least two orchestrators based on the evaluated performance and wherein a first merging signal is provided as the first recomposing signal, when the merging is settled and wherein the merging of the at least two orchestrators is executed when the a second merging signal as the second recomposing signal is received. This advantageously provides an enhanced embedding of a virtual network into a physical infrastructure.

In a fourth possible implementation form of the method according to the third possible implementation form of the method, the at least two orchestrators process one application and after the merging of the at least two orchestrators, one orchestrator processes the one application. This advantageously provides an efficient merging interface.

In a fifth possible implementation form of the method according to the third aspect as such or according to the any of the preceding implementation forms of the third aspect, the step of settling on a recomposing of the orchestrators comprises a copying of at least one orchestrator, wherein a copying signal is provided as the recomposing signal, when the copying is settled and wherein a copying of at least one orchestrator is executed when the copying signal is received. This advantageously provides that the components of the orchestrator can independently of each other create multiple copies of themselves.

In a sixth possible implementation form of the method according to the fifth possible implementation form, after the copying of the at least one orchestrator, two orchestrators may process one application. This advantageously provides an improved performance of the dynamic orchestration.

In a seventh possible implementation form of the method according to the fifth possible implementation form of the method, after the copying of the at least one orchestrator, at least one domain controller is moved to another orchestrator and a performance of a controlee of at least one domain controller is improved. This advantageously provides an improved performance of the dynamic orchestration.

According to a fourth aspect, the invention relates to a decision component for dynamic orchestration in a system for embedding a virtual network into a physical infrastructure according to the first aspect as such or according to any of the preceding implementation forms of the first aspect.

According to a fifth aspect, the invention relates to a recomposing component for dynamic orchestration in a system for embedding a virtual network into a physical infrastructure according to the first aspect as such or according to any of the preceding implementation forms of the first aspect.

The methods, systems and devices described herein may be implemented as software in a Digital Signal Processor, DSP, in a micro-controller or in any other side-processor or as hardware circuit within an application specific integrated circuit, ASIC or in a field-programmable gate array which is an integrated circuit designed to be configured by a customer or a designer after manufacturing—hence "field-programmable".

The invention can be implemented in digital electronic circuitry, or in computer hardware, firmware, software, or in combinations thereof, e.g. in available hardware of conventional mobile devices or in new hardware dedicated for processing the methods described herein.

These and other aspects of the present invention will become apparent from and be elucidated with reference to the embodiments described hereinafter. A more complete appreciation of the embodiments of the present invention and the attendant advantages thereof will be more clearly understood with reference to the following schematic drawings.

BRIEF DESCRIPTION OF DRAWINGS

Further embodiments of the invention will be described with respect to the following figures, in which.

DESCRIPTION OF EMBODIMENTS

In the associated figures, identical reference signs denote identical or at least equivalent elements, parts, units or steps. In addition, it should be noted that all of the accompanying drawings are not to scale.

The technical solutions in the embodiments of the present invention are described clearly in the following with detailed reference to the accompanying drawings in the embodiments of the present invention.

The embodiments of the present invention advantageously provides an orchestrator responsible for the management and mapping of virtual resources over physical resources via north bound interfaces of the domain controllers. The configurations of the said physical resources are controlled usually remotely by domain controllers. Examples of domain controllers include OpenFlow, OF, controllers, cloud managers, data center managers.

The embodiments of the present invention advantageously provide an orchestrator that can recompose itself when a given threshold in the physical size or virtual network, abbreviated vnet, request queue length is reached. In essence, replication implies the direct or indirect movement of data and configurations relating to at least one of the domain controllers under the control of one orchestrating entity to another orchestrating entity or creating a copy of the same data and configurations, with the purpose of reassigning control of the said domain controller's physical and or virtual resources to a new orchestrator.

The embodiments of the present invention may solve the problem in that the components of the orchestrator can independent of each other i) create multiple copies (or any other recomposing) of themselves ii) calculate which part of the network under their control has to be moved to which new copy (or any other recomposing) and iii) move the identified part of network there. The new copy (or any other recomposing) can be anywhere, even a thread or a process on the same machine, for instance.

According to an exemplary embodiment of the present invention, all these steps can be independent of each other, for example, the moving the network to new orchestrator can be done with pre-existing orchestrators. For the case of merging, the following steps may be performed: i) identify the networks that should be merged under which orchestrator ii) move the networks there iii) uninstall release the resources of remaining empty orchestrators.

The present invention is intended to provide a solution enabled by the fact that in a dynamic virtualized environment the orchestrator can be recomposed, for instance copied, in part or whole, dynamically and assigned to a new resource. The present invention provides that the orchestrator may become a client of itself.

The embodiments of the present invention advantageously make use of decision components and recomposing components along with the moving or merging or any other recomposing procedures, like for instance splitting. The decision components and the recomposing components are logical or virtual network components and can be collocated or implemented in one component (even within the orchestrator) or may share some functionality such as embedding with the orchestrator.

The term "recomposing" or "to recompose" as used by the embodiments of the present invention can be any kind of change or of transforming or of altering the composition or the structure or the hierarchy or the topology network entities, in particular, of the orchestration components in relation to the domain controllers.

The term "virtual network embedding" or "embedding" as used by the embodiments of the present invention may describe the efficient embedding of virtual networks with resource constraints into a substrate network.

The term "splitting" or "to split" as used by the embodiments of the present invention may describe any dividing or copying of entities, resulting in a modified composition or structure or hierarchy or topology of network entities, in particular, of the orchestration components in relation to the domain controllers.

The embodiments of the present invention may apply to future carrier networks that need to be able to scale to a vast plurality of nodes, interconnect a vast plurality of devices, and, especially, provide support for the diversified requirements of carrier grade next-generation services.

The embodiments of the present invention may provide that as a recomposing a merging can be done by distributing controllers across multiple orchestrators as well as that multiple orchestrators can merge onto multiple orchestrators, for instance, 5 to 3, or 3 to 2, or 4 to 2, or 8 to 3 or any other pair of numbers, also a merging of 2 to 1, or 3 to 1 or any higher number to 1 may be possible.

The embodiments of the present invention may provide that as a recomposing a splitting can be done by distributing multiple controllers across multiple orchestrators as well as that one or multiple orchestrators can split into multiple orchestrators, for instance, 3 to 5, or 2 to 3, or 2 to 4, or 3 to 8 or any other pair of numbers.

The embodiments of the present invention may apply to domain controllers such as OpenFlow, OF, controllers, cloud managers, data centre managers which may copy themselves or move the controlees (physical resources) under the control of newer domain controllers. Similarly, an increase in network traffic lookups from OF switches may require the OF switches to copy some of the switches under its control to another OF controller.

Domain controllers can also be other orchestrators. Orchestrators can move domain controllers or other orchestrators under their control. For instance, any controlee (managed) may be copied into another virtualized controller (manager) to improve overall performance. For example, the embodiments of the present invention may advantageously allow increasing lower layer orchestrators that can create a new higher layer orchestrator.

The embodiments of the present invention may also apply to other scenarios such as controller failure (orchestrator failure) where the failing orchestrator can be replicated to ensure continued performance of the network.

The embodiments of the present invention may apply that the copied orchestrator can be another thread/process of the same orchestrating application or another application in the same resource.

The embodiments of the present invention may apply to an example in which the orchestrator to copy itself creates a request of a newer control network which is then handled by itself (or another orchestrator).

Apparently, the described embodiments are only some embodiments of the present invention, rather than all embodiments. Based on the described embodiments of the present invention, all other embodiments obtained by persons of ordinary skill in the art without making any creative effort shall fall within the protection scope of the present invention.

Figure 1:
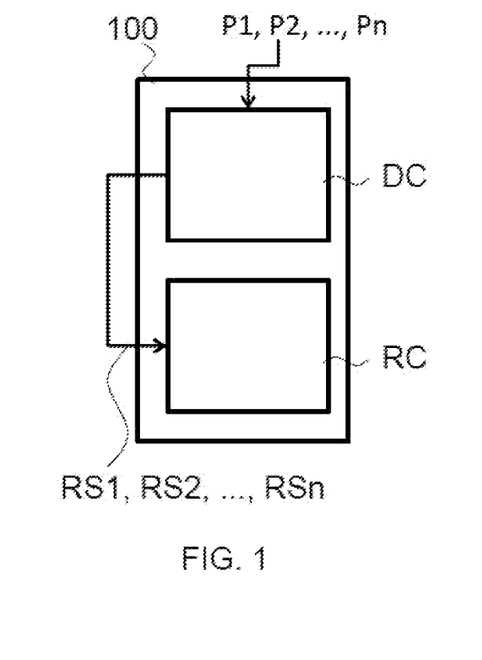
FIG. 1 shows a schematic diagram of a system for dynamic orchestration according to one embodiment of the present invention.

FIG. 1 shows a schematic diagram of a system for dynamic orchestration according to one embodiment of the present invention.

FIG. 1 shows an embodiment of a system 100 for dynamic orchestration, the system configured to be used for embedding a virtual network into a physical infrastructure, the system comprising: a decision component DC and a recomposing component RC.

The decision component DC is configured to evaluate a performance of at least one orchestrator $O_1, O_2, \ldots, O_n$ based on at least one parameter $P_1, P_2, \ldots, P_n$.

The decision component DC is configured to settle on a recomposing of the orchestrator $O_1, O_2, \ldots, O_n$ based on the evaluated performance and is configured to provide a recomposing signal $RS_1, RS_2, \ldots, RS_n$ when the recomposing is settled.

The recomposing component RC is configured to execute the recomposing of the orchestrator $O_1, O_2, \ldots, O_n$ when the recomposing signal $RS_1, RS_2, \ldots, RS_n$ is received.

Figures 2, 3:
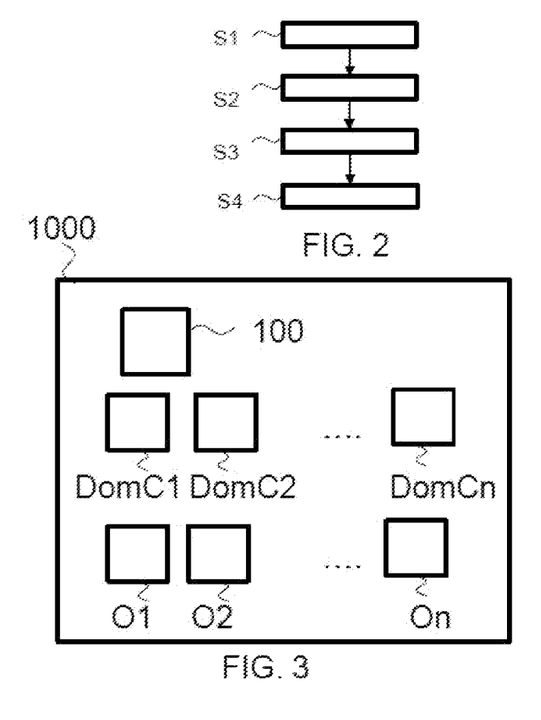
FIG. 2 shows a schematic diagram of a flowchart diagram of a method for dynamic orchestration for embedding a virtual network into a physical infrastructure according to an embodiment of the invention.
FIG. 3 shows a schematic diagram of a computer system for embedding a virtual network into a physical infrastructure according to one embodiment of the present invention.

FIG. 2 shows a schematic diagram of a flowchart diagram of a method for dynamic orchestration for embedding a virtual network into a physical infrastructure according to an embodiment of the invention.

As a first step of the method, evaluating S1 a performance of at least one orchestrator $O_1, O_2, \ldots, O_n$ based on at least one parameter $P_1, P_2, \ldots, P_n$ is conducted.

As a second step of the method, settling S2 on a recomposing of the orchestrator $O_1, O_2, \ldots, O_n$ based on the evaluated performance is conducted.

As a third step of the method, providing S3 a recomposing signal $RS_1, RS_2$, when the recomposing is settled, is conducted.

As a fourth step of the method, executing S4 the recomposing of the orchestrator $O_1, O_2, \ldots, O_n$ when the recomposing signal $RS_1, RS_2, \ldots, RS_n$ is received is conducted.

FIG. 3 shows a schematic diagram of a computer system for embedding a virtual network into a physical infrastructure according to one embodiment of the present invention.

The computer system 1000 for embedding a virtual network into a physical infrastructure may comprise a domain controller $DomC_1, DomC_2, \ldots, DomC_n$, an orchestrator $O_1, O_2, \ldots, O_n$ and a system 100 for dynamic orchestration, wherein the system is configured to be used for embedding a virtual network into a physical infrastructure.

Figure 4:
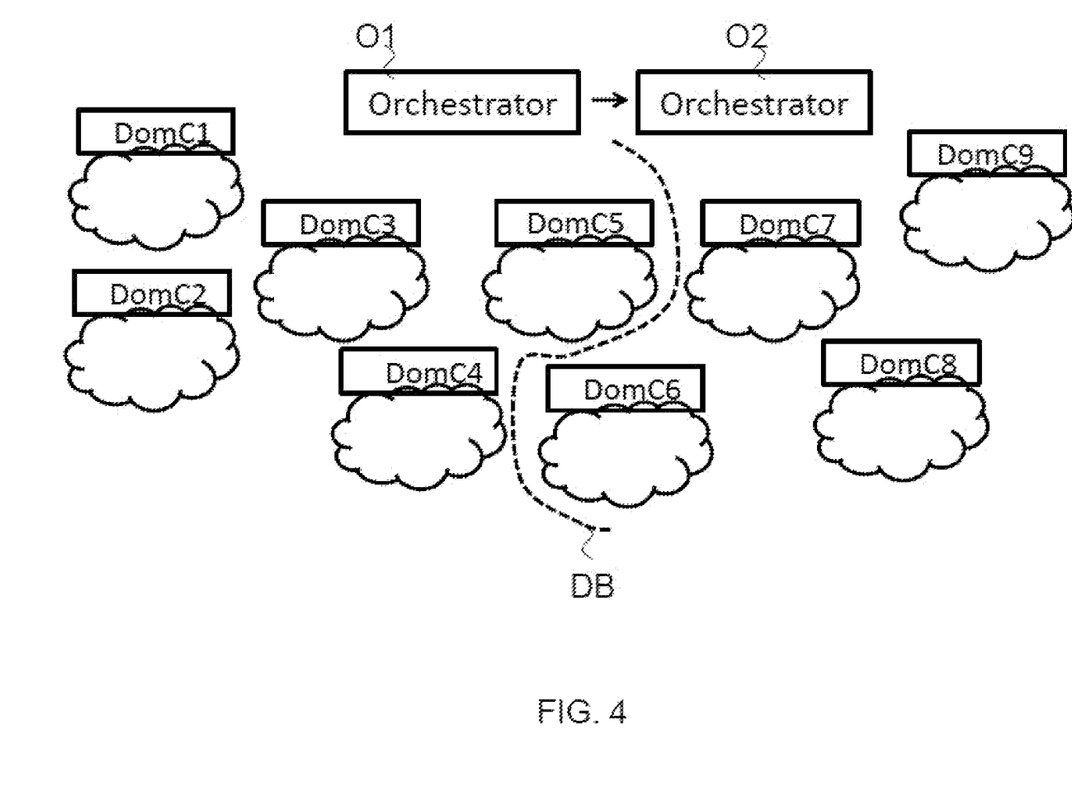
FIG. 4 shows a schematic diagram of a dynamic creation of new orchestration to manage load according to one embodiment of the present invention.

FIG. 4 shows a schematic diagram of a dynamic creation of new orchestration to manage load according to one embodiment of the present invention.

FIG. 4 shows a schematic diagram of splitting, wherein an orchestrator can replicate itself when a given threshold in the physical size or vnet request queue length is reached.

The domain controllers $DomC_{1-9}$ are originally assigned to Orchestrator $O_1$.

According to an exemplary embodiment of the present invention, the decision component DC is configured to settle on a splitting of the orchestrator $O_1$ into $O_1$ and $O_2$. The splitting of the orchestrator $O_1$ is executed by the recomposing component RC when the splitting signal is received.

According to the decision, the domain controllers $DomC_1$, $DomC_2$, $DomC_3$, $DomC_4$, and $DomC_5$ are assigned to orchestrator $O_1$, the domain controllers $DomC_6$, $DomC_7$, $DomC_8$, and $DomC_9$ are assigned to orchestrator $O_2$. The two orchestrators $O_1, O_2$ are separated by the domain border DB. This dynamic creation of new orchestration is performed and executed by the recomposing component RC in order to manage load of the two orchestrators $O_1, O_2$.

Figure 5:
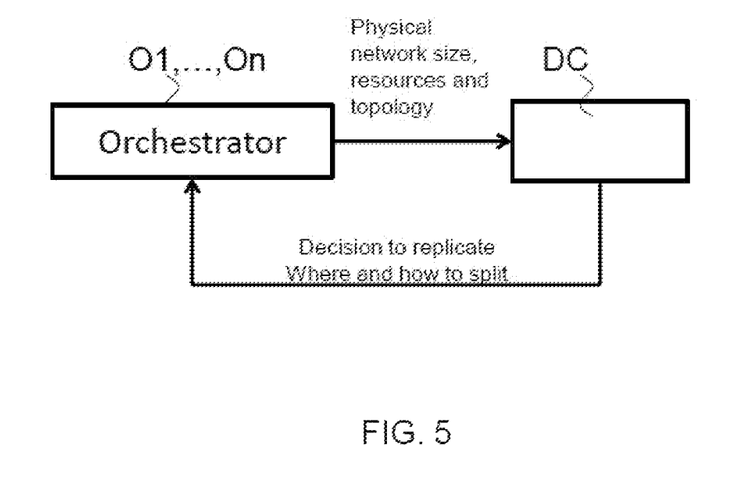
FIG. 5 shows a schematic diagram of a flowchart of decision for rearrangement for embedding a virtual network into a physical infrastructure according to one embodiment of the present invention.

FIG. 5 shows a schematic diagram of a flowchart of decision for rearrangement for embedding a virtual network into a physical infrastructure according to one embodiment of the present invention.

The decision component DC is responsible for making the decision to split the orchestrator or not. Based on the recommendation of the decision component DC, informing the orchestrator to ask the recomposing component RC to execute to splitting by transmitting the recomposing signal $RS_1, RS_2, \ldots, RS_n$.

The orchestrator $O_1, \ldots, O_n$ may periodically report various performance parameters to the decision component DC based on which the decision component DC can recommend to orchestrator to split or not or to merge or to perform any kind of recomposing. These recommendations may be based on an algorithm that can be influenced by administrator settings of various values.

The parameters $P_1, P_2, \ldots, P_n$ that the decision component DC will consider, in other words the parameter $P_1, P_2, \ldots, P_n$ that the decision component DC will use for evaluating a performance of at least one orchestrator $O_1, O_2, \ldots, O_n$ may include for instance:

Size of the physical infrastructure, i.e. the physical network or any controllers Topology of the network, for instance, including geographic locations Virtual networks embedded Network characterizing parameters (delay in control plane, number of new connection requests, migrating virtual machine states, abbreviated vms)

The parameter $P_1, P_2, \ldots, P_n$ can be a parameter of a domain controller $DomC_1, \ldots, DomC_n$ or a parameter of an orchestrator $O_1, O_2, \ldots, O_n$.

The decision component DC may work by either periodically polling the orchestrator for statistics on various parameters $P_1, P_2, \ldots, P_n$ or the orchestrator $O_1, O_2, \ldots, O_n$ may report those parameters $P_1, P_2, \ldots, P_n$ to the decision component DC periodically.

The decision component DC may review the parameters of operation of every domain controller $DomC_1, \ldots, DomC_n$ under the corresponding orchestrator $O_1, O_2, \ldots, O_n$, see FIG. 5, are within the operation limits of the control network as specified by the vendor or the administrator of the network.

For instance, the performance of an orchestrator $O_1, O_2, \ldots, O_n$ may be evaluated or measured by reviewing the parameters $P_1, P_2, \ldots, P_n$ of operation of the domain controllers $DomC_1, \ldots, DomC_n$ under the orchestrator $O_1, O_2, \ldots, O_n$. The decision component DC may periodically evaluate or measure performance parameters $P_1, P_2, \ldots, P_n$ of the domain controllers $DomC_1, \ldots, DomC_n$ under the orchestrator $O_1, O_2, \ldots, O_n$.

The decision component DC may prepare a list of all the domain controllers $DomC_1, \ldots, DomC_n$ that don't meet the parameters $P_1, P_2, \ldots, P_n$ and reports them to the orchestrator—supposing the domain controllers $DomC_1, \ldots, DomC_n$ belong to the same orchestrator—with a recommendation to move those domain controllers $DomC_1, \ldots, DomC_n$ to another orchestrator $O_1, \ldots, O_n$. For instance, moving domain controllers $DomC_1, \ldots, DomC_n$ to another orchestrator $O_1, \ldots, O_n$ helps to reduce the load of an orchestrator.

Figure 6:
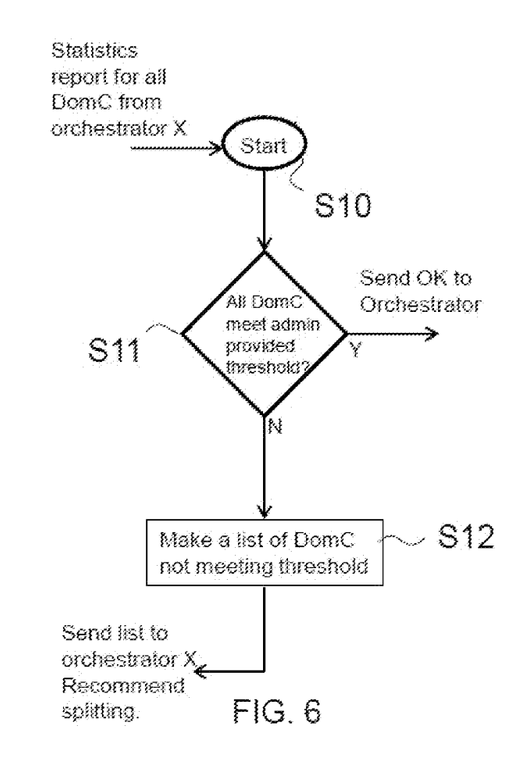
FIG. 6 shows a schematic diagram of the functioning of the decision component according to one embodiment of the present invention.

FIG. 6 shows a schematic diagram of the functioning of the decision component according to one embodiment of the present invention.

In step S10, a statistics report for at least one domain controller $DomC_1$ from an orchestrator $O_1$ may be performed. The orchestrator $O_1$ may periodically report various performance parameters to the decision component DC based on which the decision component DC can recommend to orchestrator $O_1$ to split or not.

In step S11, an evaluation whether the domain controllers $DomC_1, \ldots, DomC_n$ meet an admin provided threshold value may be performed. This advantageously ensures that the load faced by an orchestrating component may be limited.

If yes, an confirmation may be send to the orchestrator $O_1, \ldots, O_n$.

If no, in step S12, a list of domain controllers $DomC_1, \ldots, DomC_n$ not meeting the threshold may be generated and the list may be send to an orchestrator $O_1, \ldots, O_n$ and splitting or any other recomposing operation may be recommended. Based on the recomposing decision a list of domain controllers is sent to the new orchestrator responsible for them.

Figure 7:
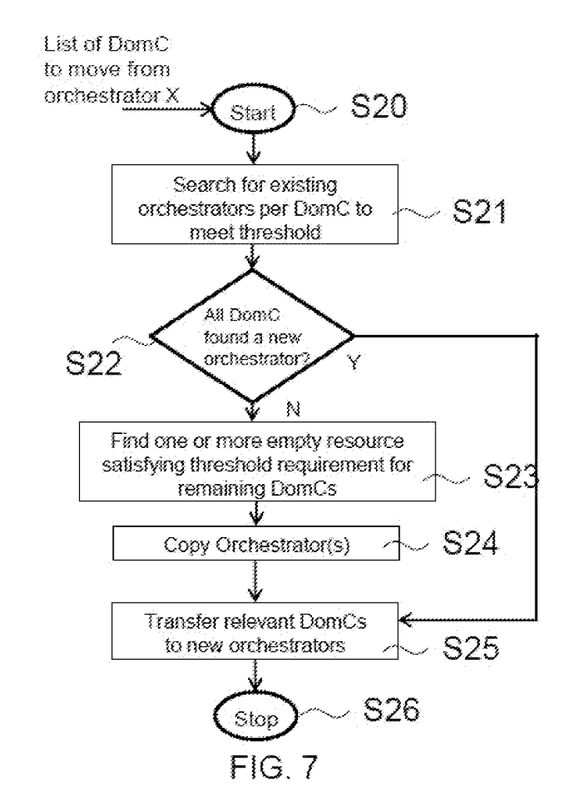
FIG. 7 shows a schematic diagram of the functioning of the recomposing component according to one embodiment of the present invention.

FIG. 7 shows a schematic diagram of the functioning of the recomposing component according to one embodiment of the present invention.

The recomposing component RC is responsible for executing the decision recommended by the decision component DC for the orchestrator $O_1, \ldots, O_n$. The recomposing component RC can co-exist with decision component DC. The recomposing component RC may find the resource to install the new orchestrator or may assign the split of the network to the new orchestrator.

The recomposing component RC may configure control channels, may transfer information of existing networks vnets or may reconfigure physical controllers and vnets to report to new orchestrator $O_1$.

In step S20, an initializing may be performed and a list of all domain controllers $DomC_1, \ldots, DomC_n$ to move from an orchestrator $O_1, \ldots, O_n$ will be transmitted.

In step S21, a search for existing orchestrators $O_1, \ldots, O_n$ per domain controllers $DomC_1, \ldots, DomC_n$ which meet the threshold value may be performed.

In step S22, an evaluation whether all domain controllers $DomC_1, \ldots, DomC_n$ found a new orchestrator $O_1, \ldots, O_n$ may be performed.

If yes, the method will continue with performing step S25.

If no, in step S23, finding one or more empty resource satisfying a threshold requirement for the remaining domain controllers $DomC_1, \ldots, DomC_n$ may be performed. If there are domain controllers $DomC_1, \ldots, DomC_n$ that cannot be matched to any orchestrator $O_1, \ldots, O_n$ then one or multiple new empty resources may be located that can best satisfy the constraints of an orchestrator controller relationship.

In step S24, a copying or a splitting of the orchestrator $O_1$ may be performed. In other words, a recomposing may be performed.

In step S25, a transfer of intended domain controllers $DomC_1, \ldots, DomC_n$ to a new orchestrator $O_2$ may be performed.

In step S26, a de-initializing may be performed.

A de-initializing may comprise a re-adjusting of constraints or threshold requirement that can be placed by the vendor and/or enhanced by the administrator or the applications using the domain controllers $DomC_1, \ldots, DomC_n$.

Figure 8:
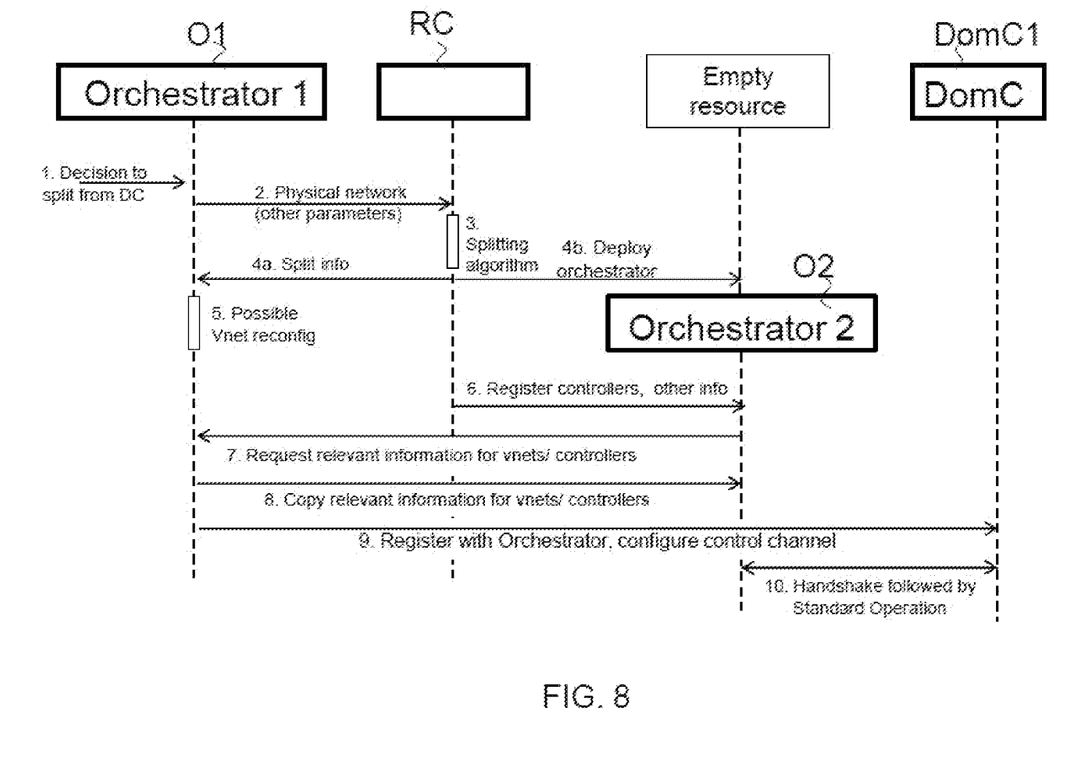
FIG. 8 shows a schematic diagram of a sequence diagram for copying and moving according to one embodiment of the present invention.

FIG. 8 shows a schematic diagram of a sequence diagram for copying and moving according to one embodiment of the present invention.

FIG. 8 shows the functions of the orchestrator together with the recomposing component RC for copying to a new empty resource and moving domain controllers. The steps in FIG. 8 are explained as follows:

1) The orchestrator $O_1$ receives the decision to split some domain controllers from its domain that do not satisfy the predetermined/preconfigured requirements.

2) The orchestrator $O_1$ provides the list of such domain controllers to the recomposing component RC, and other relevant information that it may inquire for.

3) The recomposing component RC runs a splitting algorithm deciding individually or as parts which domain controllers should be migrated where. Any splitting algorithm maybe used.

4) A) Information is provided to the orchestrator to move the domain controllers to various orchestrators; and/or B) A new resource location is identified to install an orchestration component and a copy procedure to move the identified domain controllers to the new orchestrator is initiated.

5) The old orchestrator $O_1$ determines if some service-level agreement, SLA, or contractual agreements are compromised as a result of the move of the various domain controllers and takes necessary measures to reconfigure the virtual networks to conform to those requirements.

6) The different orchestrators are contacted by the recomposing component RC asking them to take on the responsibilities of the respective domain controllers and copy theirs states from the old orchestrator.

7) Further relevant information of the virtual networks hosted on the resources controlled by those domain controllers maybe requested by the new orchestrator $O_2$ to the old orchestrator $O_1$.

8) The old orchestrator replies supplying such information. This interface may also be proactive from the old orchestrator.

9) The old orchestrator $O_1$ then can ask and/or configure the respective domain controllers $DomC_1$ to report to the new orchestrator.

10) The copy of the domain controllers $DomC_1$ to the new orchestrator $O_2$ is completed and standard operation between the domain controllers $DomC_1$ and new orchestrator $O_2$ follows.

Figure 9:
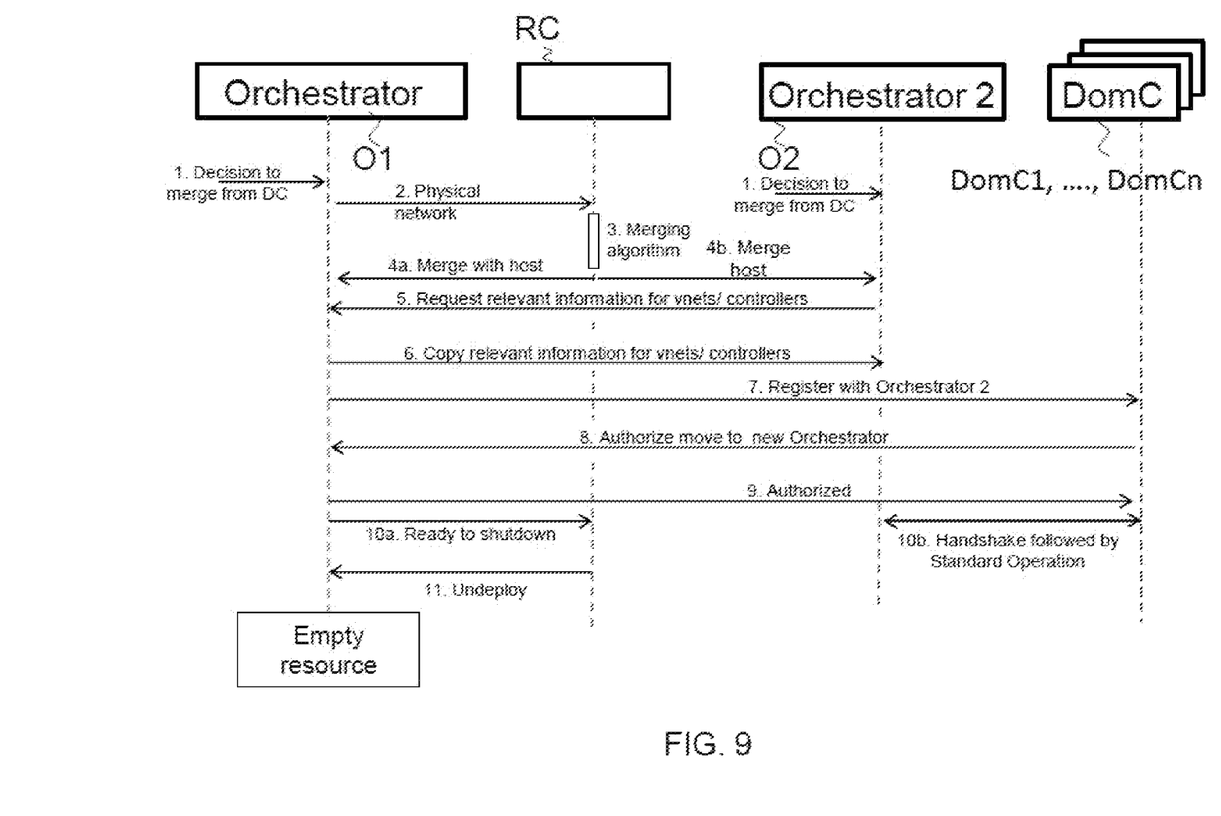
FIG. 9 shows a schematic diagram of a sequence diagram for two orchestrators to one orchestrator merged according to one embodiment of the present invention.

FIG. 9 shows a schematic diagram of a sequence diagram for two orchestrators merged into one orchestrator according to one embodiment of the present invention.

FIG. 9 shows the functions of the orchestrator together with the recomposing component RC for merging two orchestrators to one. When merging two orchestrators to one, for instance, the two orchestrators $O_1$, $O_2$ may process one application and after the merging of the two orchestrators $O_1$, $O_2$, one orchestrator $O_1$ may processes the same application. The processing of the same application can comprise a thread or a process of the same orchestrating application.

The same procedure can also cover multiple orchestrators to multiple orchestrator convergence (n to n-x where x>=0). The steps in the FIG. 9 are explained as follows:

1) Multiple orchestrators may receive the decision to merge some domain controllers $DomC_1, \ldots, DomC_n$ from their domain primarily because there are far too many orchestrators idle.

2) The orchestrator $O_1$ provides the list of all its domain controllers $DomC_1, \ldots, DomC_n$ to the recomposing component RC, and other relevant information that it may inquire for.

3) The recomposing component RC runs the merging algorithm deciding individually or as parts which domain controllers $DomC_1, \ldots, DomC_n$ should be migrated where. Any algorithm maybe used such.

4) The information is provided to the orchestrator to move all its the domain controllers to various orchestrators and to a specific (could be newly created FIG. 8 step 4B) orchestrator to accept all those domain controllers.

5) The different old orchestrators $O_1$ are contacted by the new orchestrator $O_2$ asking them to provide details of their respective domain controllers $DomC_1, \ldots, DomC_n$ and copy their states over.

6) Relevant information of the virtual networks hosted on the resources controlled by those domain controllers is provided by the old orchestrator(s) $O_1$ to the new orchestrator $O_2$. This interface may also be proactive from the old orchestrator $O_1$.

7) The old orchestrator $O_1$ then can ask/configure the respective domain controllers to report to the new orchestrator $O_2$.

8) The domain controllers $DomC_1, \ldots, DomC_n$ independent of the previous steps may also seek to authorize the move to the new orchestrator $O_2$.

9) In response to the authorization request the old orchestrator $O_1$ may authorize or deny the move.

10) A) the old orchestrator $O_1$ may request the recomposing component RC to undeploy itself since has no more domain controllers to manage.

B) the copy of the domain controllers $DomC_1, \ldots, DomC_n$ to the new orchestrator $O_2$ is completed and standard operation between the domain controllers $DomC_1, \ldots, DomC_n$ and new orchestrator $O_2$ follows.

11) The recomposing component RC may undeploy the orchestrator that has no underlying domain controllers releasing a new empty resource container.

From the foregoing, it will be apparent to those skilled in the art that a variety of methods, systems, computer programs on recording media, and the like, are provided.

The present disclosure also supports a computer program product including computer executable code or computer executable instructions that, when executed, causes at least one computer to execute the performing and computing steps described herein.

Many alternatives, modifications, and variations will be apparent to those skilled in the art in light of the above teachings. Of course, those skilled in the art readily recognize that there are numerous applications of the invention beyond those described herein.

While the present invention has been described with reference to one or more particular embodiments, those skilled in the art recognize that many changes may be made thereto without departing from the scope of the present invention. It is therefore to be understood that within the scope of the appended claims and their equivalents, the inventions may be practiced otherwise than as specifically described herein.

In the claims, the word "comprising" does not exclude other elements or steps, and the indefinite article "a" or "an" does not exclude a plurality. A single processor or other unit may fulfill the functions of several items recited in the claims.

The mere fact that certain measures are recited in mutually different dependent claims does not indicate that a combination of these measured cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems.

What is claimed is:

1. A system for dynamic orchestration, the system configured to be used for embedding a virtual network into a physical infrastructure, the system comprising a processor, and non-transitory storage coupled to the processor and having processor-executable instructions stored thereon which when executed cause the processor to:
   evaluate at least one of the following: (a) a performance of at least one orchestrator controlling a set of domain controllers, (b) a performance of a domain controller (DomC) under the at least one orchestrator, and (c) a performance of orchestrated infrastructure, based on at least one parameter ($P_1, P_2, \ldots, P_n$);
   settle on recomposing of the at least one orchestrator based on the at least one evaluated performance;
   provide a first recomposing signal when the recomposing is settled; and
   execute the recomposing of the at least one orchestrator when a second recomposing signal is received, wherein the recomposing comprises splitting of the at least one orchestrator or merging of at least two orchestrators.

2. The system according to claim 1, wherein the processor is configured to execute the recomposing by assigning or reassigning at least one DomC to the at least one orchestrator.

3. The system according to claim 1, wherein the processor is configured to evaluate the performance based on one of the following: (a) a size of a physical infrastructure of the embedded virtual network, (b) a number of DomCs assigned to the orchestrator, (c) a topology of the physical infrastructure, and (d) a performance parameter of the physical infrastructure as the at least one parameter.

4. The system according to claim 1, wherein the processor is configured to settle on a splitting of the orchestrator based on the evaluated performance and to provide a first splitting signal as the first recomposing signal when the splitting is settled, wherein the processor is further configured to execute a splitting of the orchestrator when a second splitting signal as the second recomposing signal is received.

5. The system according to claim 4, wherein the processor is configured to execute the splitting of the orchestrator by allocating resources for installing a new orchestrator and to allocate at least one domain controller of the at least one orchestrator to the new orchestrator.

6. The system according to one of claim 1, wherein the processor is further configured to settle on a merging of at least two orchestrators based on the evaluated performance and to provide a first merging signal as the first recomposing signal when the merging is settled and wherein the processor is further configured to execute a merging of the at least two orchestrators when a second merging signal as the second recomposing signal is received.

7. The system according to claim 6, wherein the processor is configured to execute the merging of the at least two orchestrators by allocating resources for the merged orchestrator and wherein the processor is further configured to allocate at least one domain controller to the merged orchestrator.

8. A decision component for dynamic orchestration in a system for embedding a virtual network into a physical infrastructure according to claim 1.

9. A recomposing component for dynamic orchestration in a system for embedding a virtual network into a physical infrastructure according to claim 1.

10. A computer system for embedding a virtual network into a physical infrastructure comprising:
    a domain controller;
    an orchestrator controlling a set of domain controllers; and
    a system for dynamic orchestration according to claim 1.

11. The computer system according to claim 10, wherein the computer system is configured to be used in a carrier grade telecommunication or in a computer network.

12. A method for dynamic orchestration for embedding a virtual network into a physical infrastructure, the method comprising:
    evaluating a performance of at least one orchestrator controlling a set of domain controllers, based on at least one parameter;
    settling on a recomposing of the orchestrators based on the evaluated performance;
    providing a first recomposing signal, when the recomposing is settled; and
    executing the recomposing of the orchestrator when a second recomposing signal is received,
    wherein the recomposing comprises splitting of the at least one orchestrator or merging of at least two orchestrators.

13. The method according to claim 12, wherein the settling on the recomposing of the orchestrator comprises:
    executing a splitting of the orchestrator when a second splitting signal as the second recomposing signal is received; and
    wherein a first splitting signal is provided as the first recomposing signal when the splitting is settled.

14. The method according to one of the claim 12, wherein the evaluating the performance of the at least one orchestrator comprises:
    determining whether any of the following situations occurs:
    a failure of at least one domain controller under the at least one orchestrator;
    a failure of the at least one orchestrator; and
    a failure of an communication channel.

15. The method according to claim 12, wherein the settling on the recomposing of the orchestrators comprises:
    executing a merging of at least two orchestrators based on the evaluated performance when a second merging signal as the second recomposing signal is received; and
    wherein a first merging signal is provided as the first recomposing signal, when the merging is settled.

* * * * *